United States Patent [19]

Thorsrud

[11] E Patent Number: Re. 31,696

[45] Reissued Date of Patent: Oct. 2, 1984

[54] COMPOSITION FOR PRODUCING ARTICLE SIMULATING PLANTATION CREPE RUBBER

[75] Inventor: Agmund K. Thorsrud, Bartlesville, Okla.

[73] Assignee: Phillips Petroleum Company, Bartlesville, Okla.

[21] Appl. No.: 487,365

[22] Filed: Apr. 21, 1983

Related U.S. Patent Documents

Reissue of:

[64] Patent No.: 4,306,034
Issued: Dec. 15, 1981
Appl. No.: 200,719
Filed: Oct. 27, 1980

U.S. Applications:

[63] Continuation of Ser. No. 61,625, Jul. 31, 1979, Pat. No. 4,256,850, which is a continuation-in-part of Ser. No. 943,825, Sep. 19, 1978, abandoned.

[51] Int. Cl.[3] ..... C08J 9/00; C08L 53/02

[52] U.S. Cl. ..... 521/88; 521/92; 521/95; 521/97; 521/139; 521/140; 521/915; 525/92; 525/98; 525/99; 525/901

[58] Field of Search ..... 521/88, 92, 95, 97, 521/139, 140, 915; 525/98, 99, 92, 901

[56] References Cited

U.S. PATENT DOCUMENTS

| | | | |
|---|---|---|---|
| 2,459,225 | 1/1949 | Hickok | 219/47 |
| 2,465,307 | 3/1949 | Fox et al. | 260/443 |
| 2,476,308 | 7/1949 | Klein | 252/312 |
| 3,242,238 | 3/1966 | Edberg et al. | 264/26 |
| 3,278,508 | 10/1966 | Kahle et al. | 526/176 |
| 3,281,383 | 10/1966 | Zelinski et al. | 260/23.7 |
| 3,297,780 | 1/1967 | Janssen | 524/22 |
| 3,414,528 | 12/1968 | Hall | 260/2.5 |
| 3,562,204 | 2/1971 | Van Breen | 524/505 |
| 3,637,554 | 1/1972 | Childers | 525/98 |
| 3,639,521 | 2/1972 | Hsich | 260/880 |
| 3,640,913 | 2/1972 | Cerra | 264/26 XV |
| 3,705,071 | 12/1972 | Gras | 161/116 |
| 3,803,274 | 4/1974 | Nakashima et al. | 264/26 |
| 3,823,109 | 7/1974 | Middlebrook | 260/23.7 R |
| 3,826,776 | 7/1974 | Wright | 260/42.14 |
| 3,832,111 | 8/1974 | Dunlap et al. | 425/407 XV |
| 3,950,292 | 4/1976 | Cooper | 260/23.7 R |
| 3,985,702 | 10/1976 | Himes | 525/98 |
| 4,003,860 | 1/1977 | Le Clerc | 521/139 |
| 4,022,856 | 5/1977 | Maxey | 264/26 |
| 4,073,831 | 2/1978 | Tabana et al. | 525/98 |
| 4,075,285 | 2/1978 | Tabana et al. | 525/99 |
| 4,110,139 | 8/1978 | Mashida et al. | 264/26 XV |
| 4,195,136 | 3/1980 | Sato et al. | 525/98 |
| 4,256,850 | 3/1981 | Thorsud | 521/140 |
| 4,352,854 | 10/1982 | Siedenstrang et al. | 428/318.8 |

FOREIGN PATENT DOCUMENTS

| | | |
|---|---|---|
| 0000920 | 7/1979 | European Pat. Off. . |
| 1795547 | 7/1973 | Fed. Rep. of Germany . |
| 953750 | 4/1964 | United Kingdom . |
| 1092563 | 11/1967 | United Kingdom . |
| 1111250 | 4/1968 | United Kingdom . |

OTHER PUBLICATIONS

Bobovich, B. B., L. V. Kryuchkova and V. P. Popova, "Preparation of Porous Mouldings from Thermoplastic Plastomers" in *International Polymer Science and Technology*, vol. 3, No. 1, 1976, pp. T/115-117.

*Primary Examiner*—Morton Foelak

[57] ABSTRACT

A molded article simulating the appearance of natural plantation crepe rubber and a method for producing this article. Styrene/butadiene linear or radial block copolymer having a polymerized styrene content of the range of about 20 to about 50 weight percent of the total block copolymer and resinous polymer of vinyl-substituted aromatic compound in the range of about 10 to about 60 parts resinous polymer per 100 parts block copolymer are blended with a sufficient amount of polarizing agent to achieve rapid heating through response to microwave treatment. The composition is melted, molded against a surface mirroring the appearance of plantation crepe rubber, and removed from the mold as an article simulating plantation crepe rubber. In an embodiment of the invention with chemical blowing agent incorporated into the molding composition, an amount of the molding composition is introduced with the mold that upon activation of the blowing agent during the molding operation produces a molded article having a normally dense skin with a microporous interior.

2 Claims, No Drawings

COMPOSITION FOR PRODUCING ARTICLE SIMULATING PLANTATION CREPE RUBBER

Matter enclosed in heavy brackets [ ] appears in the original patent but forms no part of this reissue specification; matter printed in italics indicates the additions made by reissue.

BACKGROUND OF THE INVENTION

This *is a reissue of Ser. No. 200,719 filed Oct. 27, 1980, now U.S. Pat. No. 4,306,304, which* is a continuation application of my copending application, Ser. No. 61,625, filed July 31, 1979 *now U.S. Pat. No. 4,256,850* which is a continuation-in-part application of my application Ser. No. 943,825, filed Sept. 19, 1978, *now abandoned.*

This invention relates to rubbery compositions and articles molded therefrom. In one of its aspects this invention relates to a process for molding articles. In another of its aspects this invention relates to molding compositions. In another of its aspects this invention relates to the use of energy of microwave frequency in molding thermoplastic compositions.

Natural plantation crepe rubber has for half a century been successfully used in making shoe soles. It is produced from high quality natural rubber by coagulating natural rubber latex after adding preservatives, drying and sheeting the material in thin gauge from special mills or calenders and rolling the sheets on a drum. After reaching the desired thickness, from 3/16 to about ½ inch, the material is cut off the drum to form sheets. The sheets are wrapped to protect them from light and contamination and are sold generally for use in making shoe soles. The material rejected in the cutting of shoe soles and wedges amounts to around 25% or even more of the sheet material.

Some of the disadvantages of natural plantation crepe rubber are (1) a high initial cost, (2) a high rate of rejected material which cannot be directly recycled, (3) color variation within the two standard colors available, (4) sticky surface, (5) static electricity which attracts dirt to the sticky surface so that the material, which is nearly impossible to wash, will look and be dirty after a very short time of use, (6) poor stitch resistance. I have found that all of these disadvantages can be overcome by production of the simulated crepe rubber described hereinafter. Furthermore the simulated crepe rubber has the advantage of better abrasion resistance than natural crepe rubber to provide shoe soles of greater durability. By using simulated crepe rubber which has an interior expanded with microporosities even greater economies of molding composition are realized without decreasing wear resistance.

It is therefore an object of this invention to provide a molded polymeric material that simulates the appearance of natural plantation crepe rubber. It is another object of this invention to provide a method for preparing a molded article simulating the appearance of natural plantation crepe rubber. It is still another object of this invention to provide simulated crepe rubber that is microporous.

Other aspects, objects, and the various advantages of this invention will become apparent upon reading this specification and the appended claims.

STATEMENT OF THE INVENTION

According to this invention a molded article simulating the appearance of natural plantation crepe rubber is provided. The composition of the molded article comprises (1) styrene/butadiene linear or radial block copolymer having a polymerized styrene content of the range of about 20 to about 50 weight percent, preferably of about 25 to about 35 weight percent of the total block copolymer, the remainder being polymerized butadiene, and (2) resinous, solid polymer of vinyl-substituted aromatic compound in the range of about 10 to about 60 parts resinous polymer per 100 parts block copolymer.

In an embodiment of the invention a method is provided for producing a molded article simulating the appearance of natural plantation crepe rubber in which a composition comprising styrene/butadiene linear or radial block copolymer having a polymerized styrene content in the range of about 25 to about 35 weight percent of the total block copolymer and resinous polymer of vinyl-substituted aromatic compound in the range of about 10 to about 60 parts resinous polymer per 100 parts block copolymer are blended with a sufficient amount of polarizing agent to permit rapid heating using energy at microwave frequencies. The composition is introduced into a mold having molding surfaces formed against natural plantation crepe rubber or otherwise caused to provide a surface mirroring natural crepe rubber, the composition is melted using microwave energy, molded, and removed from the mold as an object having the appearance of natural plantation crepe rubber.

In another embodiment of the invention sufficient blowing agent is dispersed throughout the molding composition so that during the molding process the blowing agent is activated by the elevated temperature to give off gas which produces a microporous structure within a skin of normally dense polymer that is formed against a surface mirroring the appearance of natural crepe rubber so that the surface of the molded skin formed has the appearance of natural plantation crepe rubber. The microporous structure which is protected by a thick skin does not sacrifice abrasion resistance as compared to that produced without blowing agent, and the very tiny bubbles produced cause the molded object to have increased opacity and a softer touch than that produced without blowing agent. The microporous structure is less dense than the structure produced without using blowing agent thereby presenting an overall saving of molding composition.

In practicing this invention normally solid linear and radial teleblock copolymers having a polymerized styrene content in the range of about 25 to about 35 weight percent of the total block copolymer, with the remainder being polymerized butadiene and which characteristically exhibit high tensile strength and elongation in their natural condition, e.g., nonvulcanized state, are the most useful for supplying the look of natural plantation crepe rubber to a generally uniformly dense molded article. Molded articles containing an elastomer with the described styrene content most clearly simulate the look, feel, snappiness and abrasion resistance of natural crepe rubber. Presently preferred polymers are linear of radial 30/70 styrene/butadiene block copolymers having inherent viscosities ranging from about 0.8 to 1.6 as determined by procedure in U.S. Pat. No. 3,278,508, col. 20, note (a).

The polymerized styrene content in the linear or radial styrene/butadiene block copolymers used in the microporous formulations preferably can range from about 25 to about 35 weight percent. Again, in the microporous formulations the preferred polymers are linear or radial 30/70 styrene/butadiene copolymers having inherent viscosities ranging from about 0.8 to 1.6, as discussed above.

The other polymers employed in forming the compositions are resinous, solid polymers of vinyl-substituted aromatic compounds, e.g., styrene alpha-methyl styrene, etc., either used alone or copolymerized with a monomer such as acrylonitrile or a conjugated diene such as butadiene. Such homopolymers and copolymers generally have densities in the range of about 1.04 to about 1.10 g/cc (ASTM D 792), a tensile strength in the range of about 5,000 to about 12,000 psi (34.5–82.7 MPa), ASTM D 638, and a Shore A Hardness ranging from about 35 to about 95 (ASTM D 2240) at about 23° C. These polymers are mixed with the elastomers in a range of about 10 to about 60 parts resinous polymer per 100 parts block copolymer. The resinous polymers can be used individually or in mixture with the presently preferred composition containing a mixture of poly(alpha-methylstyrene) and crystal polystyrene in the range of about 20 to 35 parts poly(alpha-methylstyrene) per 100 parts block copolymer and about 10 to about 25 parts crystal polystyrene per 100 parts block copolymer.

Polarizing agents are included in the compositions used in the process of this invention to insure that the compositions will melt in a microwave field. The polar compounds employed in the invention are normally liquid or solid in nature and are selected from among simple and polymeric alkylene glycols and their mono and dialkyl ethers, ethanolamines and isopropanolamines and their hydrocarbyl-substituted derivatives and mixtures thereof. Exemplary compounds include ethylene glycol, 1,2-propylene glycol, 1,3-butylene glycol, 1,4-butylene glycol, 1,6-hexylene glycol, diethylene glycol, triethylene glycol, dipropylene glycol, thiodiethylene glycol, etc., polyethylene glycols having average molecular weights ranging from about 200 to about 6,000; polypropylene glycols having average molecular weights averaging from about 400 to about 2,000; mixed poly(ethylene)-poly(propylene) glycols having average molecular weights ranging up to about 6,000 and containing from about 30 to about 90 wt. % ethylene oxide; the monomethyl, monoethyl and monobutyl ethers of ethylene glycol, propylene glycol and diethylene glycol; the monomethyl and monoethyl ethers of triethylene glycol; the dimethyl and diethyl ethers of diethylene glycol, dipropylene glycol and tirmethylene glycol; the alkanolamines based on ethanol and isopropanol such as mono-, di- and triethanolamine, mono-, di- and triisopropanolamine, methylethanolamine, dibutylethanolamine, phenyldiethanolamine, di-(2-ethylhexyl)ethanolamine, dimethylisopropanolamine, dibutylisopropanolamine, and the like; and mixtures thereof. Other polar compounds such as liquid acrylonitrile butadiene polymers, acrylonitrile butadiene blends with homopolymers of polyvinylchloride and styrene acrylonitrile copolymers are effective. Additional agents for this purpose also include glyceryl diacetate (diacetin), di(2-hydroxyethyl)-5,5-dimethylhydantoin (Dantocol DHE, trademark of Glycol Chemicals, Inc., Greenwich, Conn.), styrene acrylonitrile resin (SAN 124 from Dow Chemical) and normally solid resinous ethylenevinyl acetate copolymers. Particularly suitable polarizing agents include triethanolamine and diethylene glycol or polyethylene glycol e.g., Carbowax® 1540, totaling from about 5–8 parts php. Other additives employed can include fillers, plasticizing agents, processing aids, resin, stabilizers and the like. The final compositions can be molded into dense articles, e.g., articles that have a spcific gravity of about 1.

Polarizing agents selected from among solid nitrile rubbers, polychloroprene polymers and carbon black are not suitable for use in the applications envisioned in the instant invention because compositions containing such agents do not flow readily under the low molding pressures utilized in the process of this invention.

Sufficient polarizing agent is included in the compositions of the instant invention to insure that they will be heat softened quickly when placed in a microwave field. Generally, the amount of polarizing agent utilized ranges from about 0.5 to about 20 parts by weight per 100 parts by weight thermoplastic elastomer and more preferably from about 0.75 to about 10 parts by weight for reasons of economy coupled with adequate response to the microwaves. Heating times employed are selected to achieve rapid softening of the compositions to moldable consistency without deleterious effects caused by local overheating. Generally, the heating times used can range from about 4 seconds to about 4 minutes. From a commercial standpoint, however, heating times ranging from about 4 to about 55 seconds are employed to obtain favorable production rates and this is a preferred range. The average temperature of the heat softened composition can range from about 250°–320° F. (120°–160° C.) or higher.

Other components used in preparation of the instant invention can include odorants, colorants and fillers, e.g., silica, clay, silicates, Wollastonite, calcium carbonate, glass beads and fibers, and the like. Plasticizing agents compatible with the thermoplastic elastomer and other resinous polymers can be employed if desired. Examples of these plasticizing agents include naphthenic petroleum oils, e.g., ASTM type 104A, esters of adipic acid, phthalic acid, etc. Processing aids include the metal stearates, e.g., calcium stearate, zinc stearate, silicones, natural and synthetic waxes, and the like. Antioxidants and UV stabilizers can be added as desired from suitable commercially available materials. Exemplary of these include thiodipropionic esters, e.g., dilaurylthiodipropionate, hindered phenolic antioxidants, e.g., 2,6-di-t-butyl-4-methyl-phenol, octadecyl[3-(3,5-di-t-butyl-4-hydroxyphenyl)]propionate, thiodiethylene bis(3,5-di-t-butyl-4-hydroxy) hydrocinnamate, etc., and UV stabilizers such as 2(2'-hydroxy-5'-methylphenyl) benzotriazole, 2-hydroxy-4-n-octoxybenzophenone, [2,2'-thiobis(4-t-octyl-phenolato)]-n-butylamine-nickel-(II) etc. Generally, the amounts of the various components in parts by weighrt per 100 parts by weight thermoplastic elastomer (php), when present, will be as follows: filler, 10 to 150 php, plasticizing agent 20 to 50 php; antioxidant, 0.1 to 1 php, and UV stabilizer 0.1 to 3 php.

In another embodiment, articles are formed from compositions generally similar to those utilized in producing the dense articles except that a chemical blowing agent(s) is included. Such articles have a normally dense skin with a microporous interior. The quantity of blowing agent(s) employed can vary over a fairly broad range, e.g., from about 0.5 to 10 php by weight of total polymeric mixture, depending upon the desired specific gravity of the finished articles. To produce a microporous article having a specific gravity in the presently most desirable range of about 0.8–0.9, for example, a total of about 3–6 php of the blowing agent(s) can be used. Molded articles having a specific gravity of less than about 0.7 begin to lose tear strength and are, therefore, less desirable in the presently proposed use.

Suitable chemical blowing agents, generally nitrogen-releasing agents, will have decomposition temperatures in the compositions ranging from about 140°–200° C. Exemplary compounds, which are commercially available, include N,N'-dinitrosopentamethylenetetramine, 4,4'-oxybis (benzenesulfonyl hydrazide) (OBSH) and azobisformamide (azodicarbonamide) (ABFA). Generally suitable compositions can include about a 50/50 weight mixture of OBSH and ABFA. OBSH is of value since it can simultaneously act as a blowing agent and a crosslinking agent. ABFA is of value because it does not support combustion, is flame inhibiting and disperses readily in the compositions as well as providing a convenient source of nitrogen gas when it decomposes. The decomposition temperature can be adjusted to some extent by employing different ratios of OBSH and ABFA for example.

The formulations can be mixed together prior to the molding operation by method known in the art. A high intensity mixer such as a Henschel mixer can be employed if all components are in liquid and/or particulate form. Components can be mixed together at temperatures above the melting points of the polymers employed but the temperature must be lower than the decomposition temperature of any blowing agents, if present. Melt blending can be effected by roll mills, Banbury mixers extruders, and the like. However, it is preferable to convert the resulting molten products into compounded slabs of appropriate dimensions or into a free-flowing particulate form by employing conventional practices such as pelletizing, grinding, etc.

The molds employed in shaping the invention compositions are generally constructed from low cost, relatively low strength materials including silicone rubber, polysulfide rubber, polyurethane, plaster, cast aluminum, and the like. The nature of the mold is dependent upon the molding process used. If the invention composition is placed within the mold and the entire assembly is preheated by microwave energy, it is preferred that the mold used be made of a material such as silicone rubber that has a lower dielectric loss factor than the invention composition. It is within the scope of this invention to preheat the composition in a low dielectric loss container such as glass or ceramic and transfer it to a mold constructed from metals and the like for the actual shaping step. Generally, the composition is placed within a silicone rubber mold, the mold top is covered with a silicone rubber sheet or a silicone release paper, e.g., paper or the like covered with a release agent such as a silicone, and the assembly is placed between the plates of a high frequency electrical field which form a part of commercially available molding machines. The top plate is lowered to contact the release paper covering the mold and the composition is preheated by application of microwave energy for a desired length of time. After preheating to softening temperature, sufficient pressure is employed to compression mold the composition, e.g., about 10 to about 200 psig (68.9–1380 kPa), for a period of time generally ranging from about 0.1 to about 10 times the preheating time. The pressure is released, the assembly is preferably placed in a separate zone for cooling the mold and contents, after which the molded article is removed. A rotary table or the like containing a plurality of molds can be employed to provide molded parts at commercially attractive rates. Separation of the heating and cooling zones speeds production and reduces consumption of power and water.

An essential element of the mold used in molding articles according to this invention is that the surface against which the creped surface of the molded article is molded must be prepared in a manner that creates the mirror image of the surface of plantation crepe rubber. The best way to do this, of course, is to form the mold surface against a plantation crepe rubber surface. For the purpose of this invention it has been found that coating the surface of the object to be simulated, which can be a slab or an individual shoe sole for instance, with HFM-45, a silicone-rubber casting material, mixed in a ratio of about 10 to 1 by weight with Curing Agent No. 1, both ingredients distributed by Compo Industries, produces a cured molding surface that works well. The mold has the necessary characteristics, as recited above, and can be reinforced on the outside surfaces as necessary.

The molds employed when blowing agent is present in a formulation are similar to those described in that case when the blowing agent-free formulations are molded. When blowing agent is present in a formulation, however, the molds employed must be strong enough to withstand the pressure caused by the gaseous decomposition products of the blowing agent during the molding operation. If a silicone rubber mold is employed, it is desirable to reinforce it by using interlayers of a suitable reinforcing material such as glass fiber.

In the process of molding objects against these mold surfaces, when blowing agent is used, it is necessary to provide adequate room within the mold for expansion of the molded object to obtain a microporous interior surrounded by a relatively thick wall or skin of essentially nonporous material. With the molding compositions set forth herein and using the blowing agents set forth herein it has been found that by filling a mold in the range of about 80 to about 90 percent full with the molding mixture that upon subsequently subjecting the mixture to molding conditions in the closed mold, as discussed above, the desired physical appearance of the molded object is otained.

The block copolymer plastomers in this invention can also be admixed with up to about 60 parts naphthenic oil per 100 parts block copolymer, if desired. It is also within the scope of this invention to substitute up to about 30 wt. % of chemically related block and random copolymers, e.g., elastomers or plastomers, for the above plastomers to modify, for example, the mold flow or the stiffness of the final molded composition.

The microwave frequencies envisioned in this case range from about 25 to about 120 $MH_z$ (megahertz). Also molding samples are prepared by employing a Compo Industries, Inc. model J machine having a 10 killowat output at 40 $MH_z$.

EXAMPLE I

A series of compositions was prepared by mixing the components in a Banbury mixer for 6 minutes at a temperature of about 280° F. (138° C.). Each composition was dumped from the mixer at about 250° F. (121° C.) and converted into pellets. The formulations employed, shown in Table IA are in parts by weight.

TABLE I-A

SYNTHETIC PLANTATION CREPE RUBBER COMPOSITIONS

| COMPONENT | DENSE A | DENSE B | MICRO-POR-OUS C |
|---|---|---|---|
| Thermoplastic elastomer[1] | 100 | 100 | 100 |
| Poly(alpha-methylstyrene)[2] | 25 | 25 | 25 |
| Crystal polystyrene[3] | 15 | 15 | 15 |
| Ethylene/vinyl acetate copolymer[4] | — | — | 10 |
| Naphthenic extender oil[5] | 40 | 40 | 40 |
| Silica[6] | 20 | 20 | 20 |
| Stabilizer 1[7] | 0.5 | 0.8 | — |
| Stabilizer 2[8] | — | — | 1.0 |
| Stabilizer 3[9] | 0.3 | — | 0.3 |
| Zinc Stearate | 0.3 | 0.3 | 0.3 |
| Blowing agent 1[10] | — | — | 1.5 |
| Blowing agent 2[11] | — | — | 1.5 |
| Diethylene glycol[12] | 3 | — | — |
| Triethanolamine[12] | 3 | 2 | 6 |
| Polyethylene glycol[13] | — | 3 | 2 |
| Total parts | 207.1 | 206.1 | 222.6 |
| Specific gravity | 1 (Calculated) | 1 (Calculated) | 0.76 (average of 0.71 & 0.82) |

Notes:
[1]Phillips Petroleum Company, Bartlesville, OK, radial teleblock butadiene/styrene copolymer containing 70 wt. % polymerized butadiene, weight average molecular weight of 300,000.
[2]Amoco Chemical Corp., St. Paul, MN; linear homopolymer in compositions A & B; 18-210, in composition C: 18-240. The 210, 240 indicate softneing points in ° F., ASTM D 36.
[3]Cosden Oil & Chemical Co., Big Spring, TX; Cosden ® 500 Special.
[4]DuPont de Nemours, E. I. & Co., Wilmington DL; Elvax 240.
[5]Exxon Co., Houston, TX; Flexon ® 766, ASTM type 104A.
[6]PPG Industries Inc., Pittsburgh, PA; Hi Sil ® 233, precipitated, hydrated silica, 2.0 specific gravtiy, ultimate particle size of 0.022 micron ($2.2 \times 10^{-3}$mm).
[7]Argus Chemical Corp., Brookyln, NY; Mark ® 1589B.
[8]Zinc dibutyldithiocarbamate.
[9]Ciba-Geigy Industrial Chemicals, Ardsley, NY; 2(2'-hydroxy-5'-methylphenyl) benzotriazole (Tinuvin ® P).
[10]Uniroyal Inc., Chemicals Div., Naugatuck, CT; Celogen ® AZ; azobisformamide.
[11]Uniroyal, Inc. Celogen ® OT, 4,4'oxybis(benzenesulfonyl hydrazide).
[12]Polarizing agent.
[13]Polarizing agent, Union Carbide Corp., New York, NY; Carbowax ® 540, average molecular weight of about 540.

A suitable portion of each pelleted composition was used to fill a silicone rubber mold at room temperature having dimensions of 6 inches×6 inches (15×15 cm) and an average cavity depth of about ⅓ inch (0.8 cm). Each filled mold was covered with a paper release sheet, the assembly was placed in a commercial molding machine employing microwave energy as the heating medium, the top molding plate lowered to contact the release paper covering the mold at a pressure of about 40 psig (280 kPa gage) and the microwave unit was energized to preheat the composition. After 3 to 6 seconds, pressure is automatically increased to 120 psi and held for 25 seconds to attain a temperature of 300° F. The microwave field was turned off and the assembly held in the press to cool or transferred to another press to cool in which cooling water (about 50° F., 10° C.) was being circulated through the platens and the assembly in contact with the platens was cooled for about 2 minutes. The press was opened and the product was removed from the mold at about 120° F. (49° C.).

The preheat times employed and results obtained are presented either in Table I-B or in the subsequent remarks.

TABLE I-B

PHYSICAL PROPERTIES OF COMPOSITION A AND PLANTATION CREPE RUBBER

| | COMPOSITION A | | NATURAL CREPE RUBBER (typical) |
|---|---|---|---|
| | Injection Molded at 380° F. (193° C.) | Flow Molded at 290° F. (143° C.) (10 min) | Compression Molded at 290° F. (10 min) |
| Tensile strength, psi (MPa) | 1820 (12.5) | 2350 (16.2) | 80 (0.55) |
| 300% modulus psi (MPa) | 610 (4.12) | 410 (2.8) | 30 (0.21) |
| Elongation, % | 740 | 840 | 880 |
| Shore A Hardness | 74 | 66 | 25 |
| Tear strength, lbs/lineal inch (1) (kg/cm) | nd[4] | 270 (48) | 80 (14) |
| NBS abrasion resistance % of RMA[2] | 74 | 81 | 27 |
| Flow molded heating time, seconds | na[5] | 20 | na |
| Surface resistivity at 23° C., 2 min. after voltage application, ohm[3] | $1.3 \times 10^{12}$ | $2.3 \times 10^{10}$ | $4.1 \times 10^{15}$ |

[1]ASTM D 624-Die B
[2]ASTM D 1630, RMA = Rubber Manufacturing Association Standard
[3]ASTM D 257
[4]Not determined
[5]Not applicable Physical properties obtained from flow molded specimens of a typical dense composition exemplified by Composition A are compared with the physical properties of a typical natural plantation crepe rubber sample compression molded at the same temperature. Although the appearance of the two molded samples are similar it can be readily seen that the synthetic product is a stronger, tougher, more abrasion resistant material than unvulcanized natural plantation crepe rubber. Also, the surface resistivity values obtained indicate that the synthetic crepe rubber material is less liable to attract dust and dirt than the natural material. A value of $10^{15}$ ohms for the natural material indicates that a staic charge will dissipate slowly. A value of $10^{10}$ ohms for Composition A indicates that a static charge will dissipate quickly, e.g., seconds or less.

The stitch resistance of a sample of molded Composition B was compared with a molded sample of the natural plantation crepe rubber. This was accomplished by placing a moled sheet of about ¼ inch (0.6 cm) on a slotted plate which was attached horizontally in the Instron tester machine (Instron Corp., Canton, OH). The thread was stitched exactly ¼ inch apart through the specimen with the ends going through the slot in the slotted plate. The ends were then fastened to the lower clamp in the Instron machine. No deformation of the test specimen was observed during subsequent pulling as the test was conducted. The results are as follows:

| | NATURAL PLANTATION CREPE | | COMPOSITION B | |
|---|---|---|---|---|
| | lbs/mil | g/mm | lbs/mil | g/mm |
| Unwaxed Linen Thread[a] lbs/mil | 0.183 | 327 | 0.269 | 480 |
| Waxed Nylon Thread[b] lbs/mil | 0.156 | 280 | 0.267 | 476 |

[a]Six cord Beaver linen shoe repair thread made in Ireland U.S. Distributor Ludlow Corp. Needham Heights, MS.
[b]Same supplier as [c] and about same thickness.

The results show that a sample of a dense synthetic plantation crepe rubber to be superior to the natural product in stitch resistance.

NBS abrasion was determined for several specimens from microporous Composition C. One specimen displayed a value of 11% of RMA and the other was 15% of RMA. Thus, the average was 13% of RMA. This value is somewhat less than natural plantation crepe having a value of 27% of RMA. However, the natural material is not foamed.

EXAMPLE (II-A) MOLD PREPARATION

Two molds are prepared from silicone rubber such that an individual shoe sole can be molded from one and a slab can be molded from the other.

In each instance, a master, e.g., crepe rubber sole, crepe rubber slab is attached to a level glass plate and surrounded by a foamed polyurethane strip about ¼ inch (0.6 centimeter) higher than the highest point of the master. The horizontal distance between master and strip can range from about ½ inch (1.3 centimeter) to any reasonable distance such as about 2 to 3 inches (5 to 7.6 centimeters). Finally, metal spacer rails about the same height as the polyurethane strip are passed around the strip to support the flat metal plate and to control the mold thickness. A thin layer of vaseline is then applied as a release coat to the master, to any exposed glass area, and to the bottom of the cover plate. A liquid silicone rubber compound (HFM-45, 10 parts by weight, and curing agent therefor, 1 part by weight, both products commercially available from Compo Industries, Inc., Waltham, Mass.) is mixed for about 2 minutes and the mixture is degassed in a vacuum chamber to substantially remove any air or gases present. A small portion of degassed mixture is poured onto the master and is rubbed in to insure good contact and to help remove any trapped air. Then a sufficient amount of degassed mixture is poured into the mold to completely cover the master. After about 15 minutes, a fiberglass screen such as that employed to screen windows, is cut to size and is placed on the rubber compound in the mold. The mold is then completely filled with the degassed mixture, the cover is placed on the mold and weighted so that it rests squarely on the metal rails thus forcing out excess rubber compounds. Curing is allowed to take place at room temperature for suitable time, about 48 hours, and the weight is then removed. As known in the art, each silicone rubber mold is finished by drilling appropriately located vent holes about 1/64 inch in diameter, so that air trapped in the mold during flow molding can be vented.

The size of the crepe rubber shoe sole selected for one master is 7½. The size of the master for the slab is 9×13 inches (23×33 centimeters). The slab master averaged about 3/8 inch (0.9 centimeter) in thickness. The sole master is about 1 inch (2.5 centimeter) at the heel and about 5/16 inch (0.8 centimeter) at the sole.

B-FLOW MOLDED SOLE PRODUCTION

The microporous composition given in Table I-A is employed and is charged to each mold so that each is filled to about 80 to 90 percent of capacity. Although particles of the composition are used in this example it is often desirable to convert such compositions into sheets from which blanks of appropriate dimensions are obtained for placement in the molds.

Each composition is molded as described earlier. The sample forms from the individual shoe sole mold faithfully mirroring the appearance of crepe rubber on the bottom and on the sides of the soles.

A sole is die cut from the slab product of the slab mold. The bottom of the slab mirrors the appearance of crepe rubber and the cut surfaces are relatively smooth in appearance. However, a die can be used which has ribbed or corregated cutting surface to obtain roughed cut surfaces for nearly simulating the appearance of crepe rubber.

The flow molded sample products have a specific gravity of about 0.8.

I claim:

1. A molding composition comprising:

(1) styrene/butadiene linear or radial block copolymer elastomer having a polymerized styrene content in the range of about 20 to abut 50 wt. % of total block copolymer the remainder being polymerized butadiene, (2) resinous solid polymer of vinyl-substituted aromatic compound in the range of about 10 to about 60 parts resinous polymer per 100 parts block copolymer elastomer, (3) a sufficient amount of polarizing agent to permit rapid heating using energy of microwave frequencies said polarizing agent chosen from the group consisting of simple and polymeric alkylene glycols and their mono- and dialkyl ethers, and ethanolamines and isopropanolamines and their hydrocarbyl-substituted derivatives, and (4) sufficient blowing agent *in the range of about 0.5 to about 6 php of total polymeric mixture, said blowing agent* dispersed throughout the rest of the composition upon activation to provide microporous structure within a skin or normally dense polymer.

[2. A molding composition of claim 1 wherein the amount of blowing agent is in the range of about 0.5 to about 10 php of total polymeric mixture.]

[3. A molding composition of claim 2 wherein the amount of blowing agent is in the range of about 3 to about 6 php of total polymeric mixture.]

4. A molding composition of claim 1 [,2 or 3] wherein said composition also comprises compounds chosen from among odorants, colorants, and fillers.

* * * * *